United States Patent [19]

Tibbs, II

[11] 4,024,921

[45] May 24, 1977

[54] FIELD BREAKING AND ROW PLOWING IMPLEMENT

[76] Inventor: Robert C. Tibbs, II, Hospital Drive, Cleveland, Miss. 38732

[22] Filed: Oct. 30, 1975

[21] Appl. No.: 627,244

[52] U.S. Cl. .................. 172/146; 172/159; 172/196; 172/202; 172/686; 172/758

[51] Int. Cl.² .......................... A01B 49/02

[58] Field of Search .......... 172/138, 139, 142, 145, 172/146, 147, 152, 155, 159, 160, 163, 165, 192, 195, 196, 201, 202, 642, 686, 687, 691, 694, 697, 699, 700, 724, 758, 197

[56] References Cited

UNITED STATES PATENTS

| 282,824 | 8/1883 | Williams | 172/159 |
|---|---|---|---|
| 629,712 | 7/1899 | Coons | 172/758 |
| 847,879 | 3/1907 | Barker | 172/159 X |
| 1,157,136 | 10/1915 | Williams | 172/640 X |
| 1,323,032 | 11/1919 | Dunning | 172/201 |
| 1,908,903 | 5/1933 | Kovar | 172/724 |
| 2,632,372 | 3/1953 | Williams | 172/142 X |
| 2,737,870 | 3/1956 | Cook | 172/142 |
| 2,775,179 | 12/1956 | Chambers et al. | 172/159 X |
| 3,185,220 | 5/1965 | Tanoue | 172/159 X |
| 3,289,771 | 12/1966 | Bennett | 172/155 |

FOREIGN PATENTS OR APPLICATIONS

| 439,367 | 9/1948 | Italy | 172/196 |
|---|---|---|---|
| 765,785 | 1/1957 | United Kingdom | 172/195 |
| 8,525 | 6/1890 | United Kingdom | 172/159 |

Primary Examiner—Richard T. Stouffer
Attorney, Agent, or Firm—Clarence A. O'Brien; Harvey B. Jacobson

[57] ABSTRACT

A plow implement which completely plows and breaks the entire surface of a field being plowed in a single pass. This plow completely pulverizes the soil by means of upright cutting blades on double-opposing moldboard plows and single moldboard plows. Additional single sweeps and deep cutting sub-soiler devices may be provided with the over-all implement.

2 Claims, 7 Drawing Figures

FIELD BREAKING AND ROW PLOWING IMPLEMENT

BACKGROUND OF THE INVENTION

1. Field of the Invention

This invention relates generally to implements for plowing fields and not only turning the soil but in addition completely pulverizing said soil so that after a single pass the land is suitable for planting.

2. Description of the Prior Art

A common problem of known implements for cultivating and plowing land is that more than one pass is usually necessary in order to completely prepare the soil for planting.

Another problem has been when organic matter is present, either in the form of growing weeds and/or old crops, or newly spread organic fertilizer type material; known plowing implements fail to completely mix said organic matter with the soil as it is broken and turned.

Another existing problem is that known implements merely turn over rows of soil and fail to pulverize and break up the soil in doing so. It is also desirable when soil is to be pulverized that any organic material involved therewith will be thin-layered with said soil so that more rapid decomposition of said organic matter will take place.

The prior art shows various farm implements, cultivating and plowing type attachments, and soil conditioning implements, but none of them disclosed the unique device as taught by this invention. Known prior art devices which may be pertinent to this invention are shown in the patents to Barton, U.S. Pat. No. 787,261; Dunham, U.S. Pat. No. 1,947,127; Kluck et al., U.S. Pat. No. 2,010,458; May, U.S. Pat. No. 2,405,796; and Caldwell et al., U.S. Pat. No. 2,781,709.

SUMMARY OF THE INVENTION

An object of the present invention is to provide a farm implement which completely plows and breaks up an entire field in one pass.

Another object of this invention is to provide an implement which completely pulverizes the soil and forms new rows in one pass.

A further object of this invention is to provide an implement for breaking the entire surface of a field previously in crops and layering, in thin layers, the soil and organic matter from the previous crops all in a single pass. A still further object of this invention is to provide an implement having upright cutting blades (swords) mounted on the plowing implements for cutting the soil into narrow strips which are turned over and moved into the row as crumbled, pulverized soil and organic matter. These thin layered areas of soil and organic matter so formed in the new rows will decompose much more rapidly than normal.

One of the primary features of this invention is that this implement will turn over and completely pulverize the soil being turned in a field all in one pass of the implement. Conventional breaking and rowing plows, as known in the prior art, merely turn or break a portion of the soil surface, the remainder being covered with turned soil or merely passed over and not broken at all. The breaking and rowing plow implement of this invention breaks and rows the entire surface of the field in one operation, i.e. that is one trip over the field does the complete job. Conventional methods use three, four, or more trips over the field to accomplish this same operation.

Another unique feature of this invention is that the implement disclosed herein, while completely pulverizing the soil, also will thin layer any existing organic matter, either old crop residue or new growth of grass and weeks, and thin layer this organic matter with the soil being pulverized. The thin-layered areas of soil and organic matter as produced by this implement will allow the organic material to decompose much more rapidly than usual.

Another feature is that the various components of the complete implement are individually adjustable so that the soil may be broken and turned to any desired depth and any desired width row may be formed.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
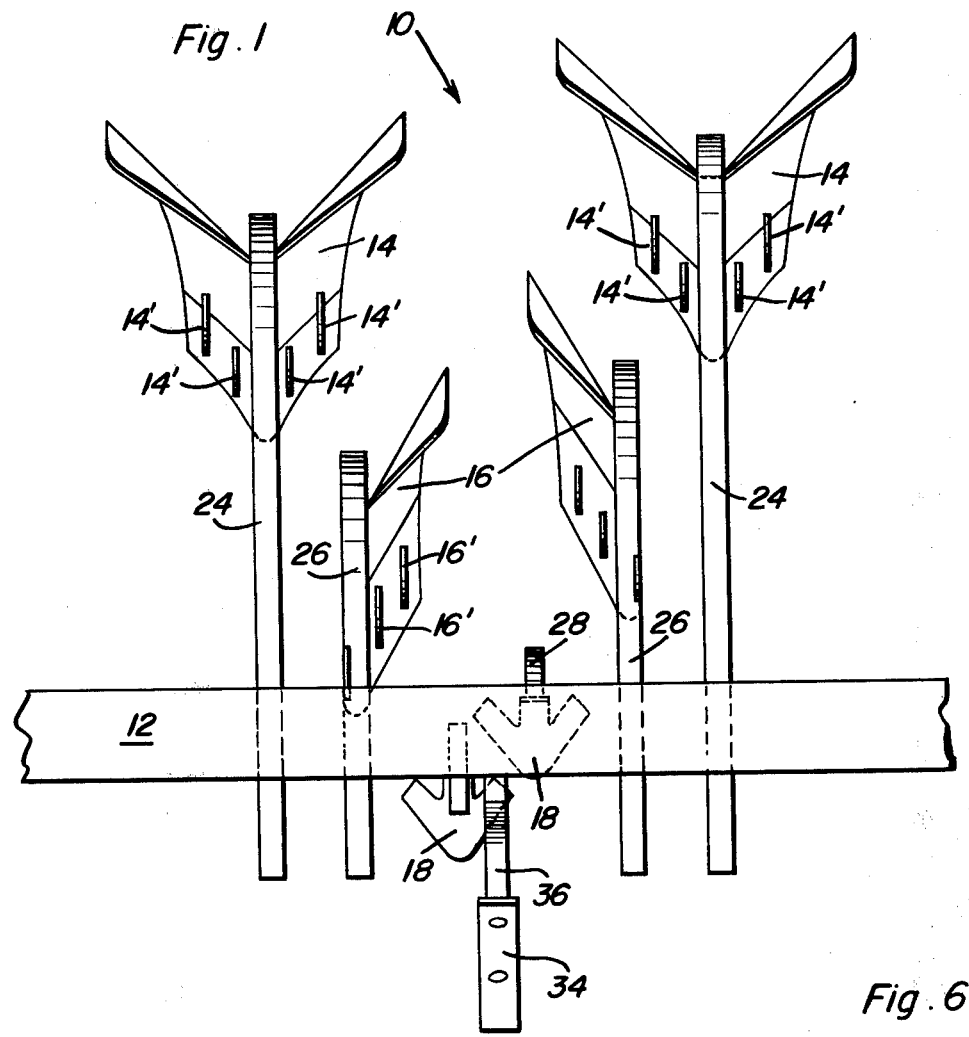
FIG. 1 is a top perspective view of the device of this invention.

Referring to FIG. 1 of the drawing, reference numeral 10 indicates the preferred embodiment of the implement of this invention. A main tool bar 12 is shown which may be of any desired length depending upon the number of implements to be mounted thereon and as limited by the size of the tractor pulling said implement. This embodiment has two double-opposing moldboard plows (middlebusters), see reference numeral 14, which are each provided at their lower leading edge with upright vertical cutting blades (swords) 14'. Adjustable shank members 24 mount these double-opposing moldboard plows to the tool bar 12 by conventional means such as U-bolts 40 shown in FIG. 2. Obviously these shanks may be longer or shorter as desired and as well known in the art. FIG. 3 shows typical adjusting means as is well known with plows of a more conventional nature.

The next structure is the single moldboard plows 16 (turning plows) correspondingly mounted on adjustable shanks 26. These single moldboard plows are also provided with upright vertical swords or cutting blades 16'. Additional single sweep plows 18 mounted on adjustable shanks 28 are shown. As a final element of the over-all implement, a deep cutting subsoiler tool 34 mounted on a shank 36 may also be provided. The use of the subsoiler is an option and depends upon the type of soil being broken and plowed and the depth of operation being undertaken. Also the number of sweeps 18 used is optional, a greater or lesser number may be used as desired for the type of soil conditions encountered.

Figure 2:
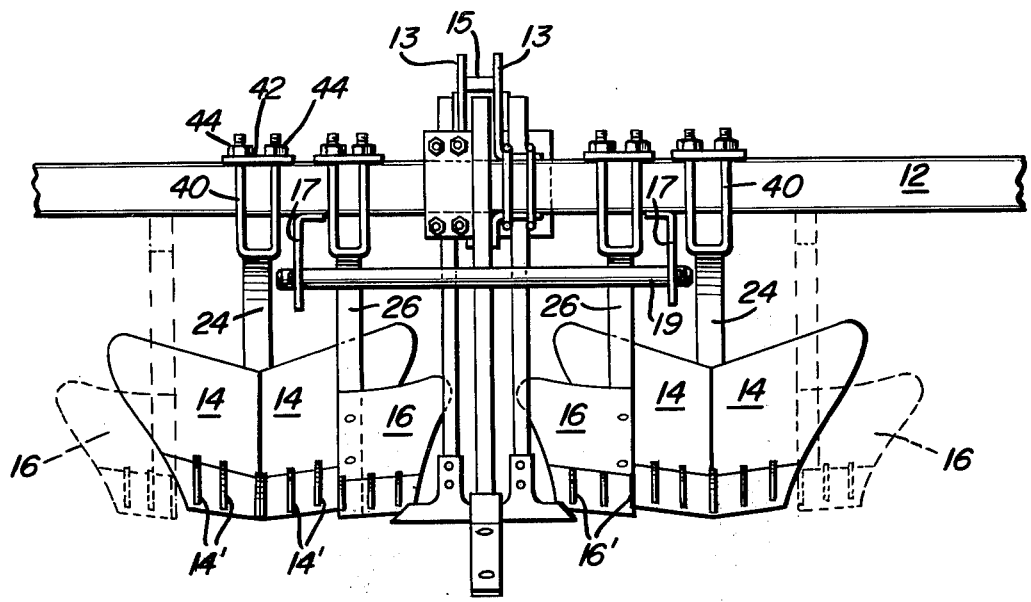
FIG. 2 is a front perspective view of the device shown in FIG. 1.
Figure 3:
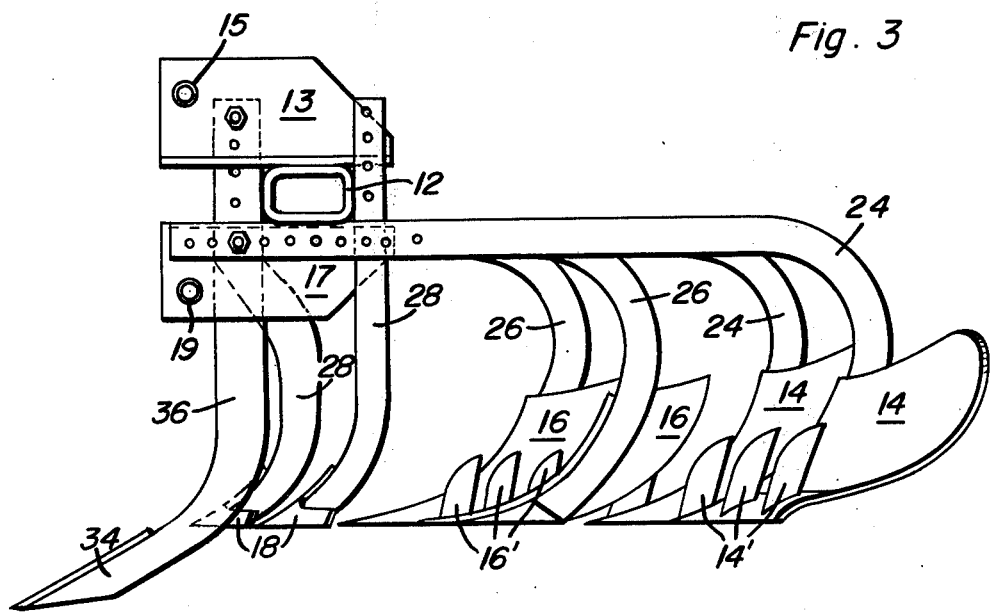
FIG. 3 is a side perspective view of the device of FIGS. 1 and 2.

The tool bar has means for attachment of the implement to a conventional three-point hitch as best seen in FIGS. 2 and 3 and comprises the flange members 17 with rod 19 for engagement with the two lower connecting elements, not shown, of the conventional tractor three-point hitch mount. The third point for the hitch is provided by the flanged plates 13 mounted at the top of the tool bar together with the pin 15 slidably engageable therewith as best seen in FIGS. 2 and 3.

Figure 6:
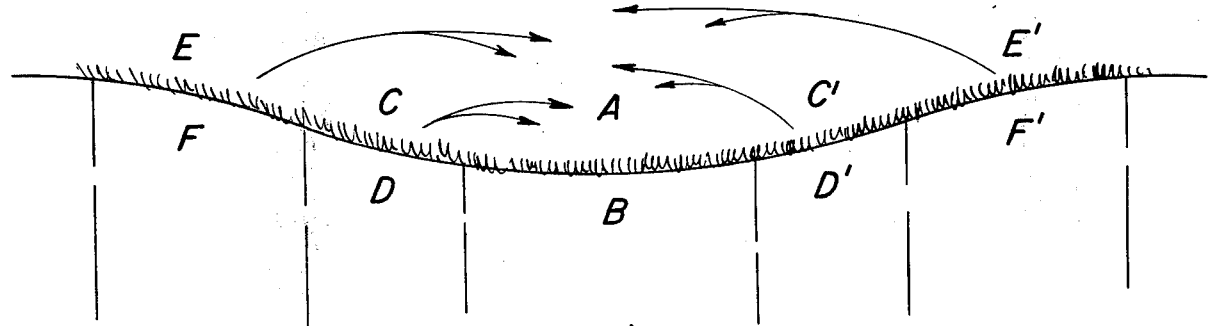
FIGS. 6 and 7 are diagrammatic views of the thin layering feature of this invention as produced by an implement as shown in FIG. 1.
Figure 7:
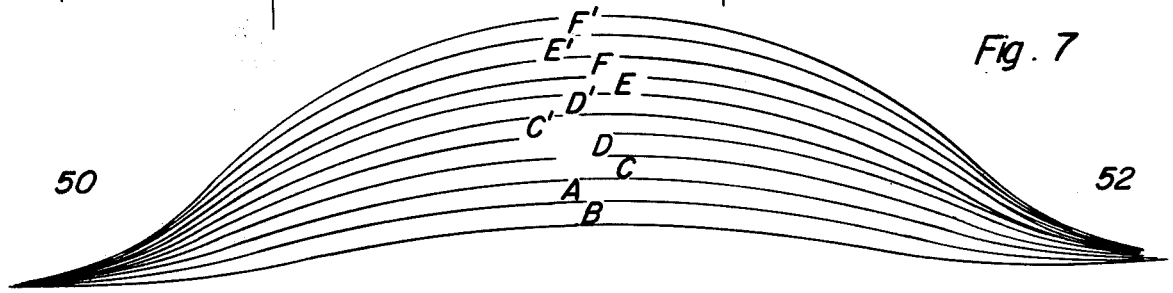

Operation of the implement as shown in FIGS. 1 to 3 will now be described. The subsoiler 34 and the sweeps 18, which are both adjustable as to depth will loosen and turn the soil as is well known with such devices. The two sweeps as shown in FIG. 1 will be considered as the first turning plow. Looking at FIGS. 6 and 7, the letters A, C, C', E, and E', at the top of FIG. 6 refer and indicate the organic matter. The letters B, D, D', F, and F', refer to the soil. FIG. 7 shows how these layers are interlayered as per the thin layer technique of this invention. The organic matter at the top of FIG. 6, as mentioned above, may be old crop residue or new plant growth or weeds. The field and soil being plowed may be old rows of previously cultivated fields or new level land. Layers A and B are turned and interleaved by the first plow comprising the two single sweeps 18. The next two layers C and D are cut, turned and pulverized by the left and foremost single moldboard plow 16 as viewed in FIGS. 1, 2 and 3. This plow cuts the soil in strips by means of the vertical swords 16' and then turns and breaks up the soil with the rest of the plow. As can be seen in FIGS. 6 and 7 the organic matter layer C is turned under and the pulverized soil section D is broken up and layered on top thereof. The next single moldboard plow, the one on the right side of the structure as seen in FIG. 1, then turns and layers C' and D' on top of the preceding layers. This is done in the same manner with the vertical cutting blades 16' and the single moldboard plow. Then the double opposing moldboard plow 14 with vertical turning blades 14', on the left and the foremost position in FIG. 1, cuts the organic matter and soil therebeneath into horizontal strips and then turns the layers E and F over and onto the preceding layers as shown in FIGS. 6 and 7. Finally the remaining double opposing moldboard plow 14 with swords 14' thereon turn over layers E', F' in the same manner as described previously for the final step in the over-all operation. Thus it can be seen that the entire section of field being plowed as covered by this implement is completely turned, and pulverized with the organic matter being thin layered in a new and unique manner.

Figure 4:
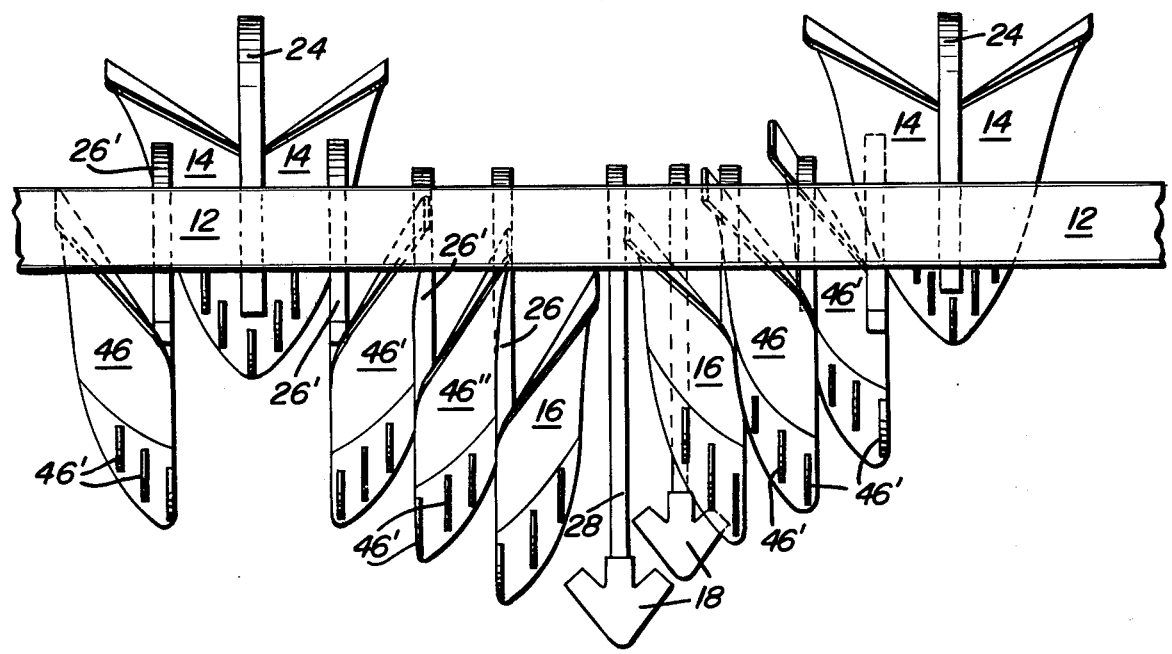
FIG. 4 is a top perspective view of a modified embodiment of the invention.
Figure 5:
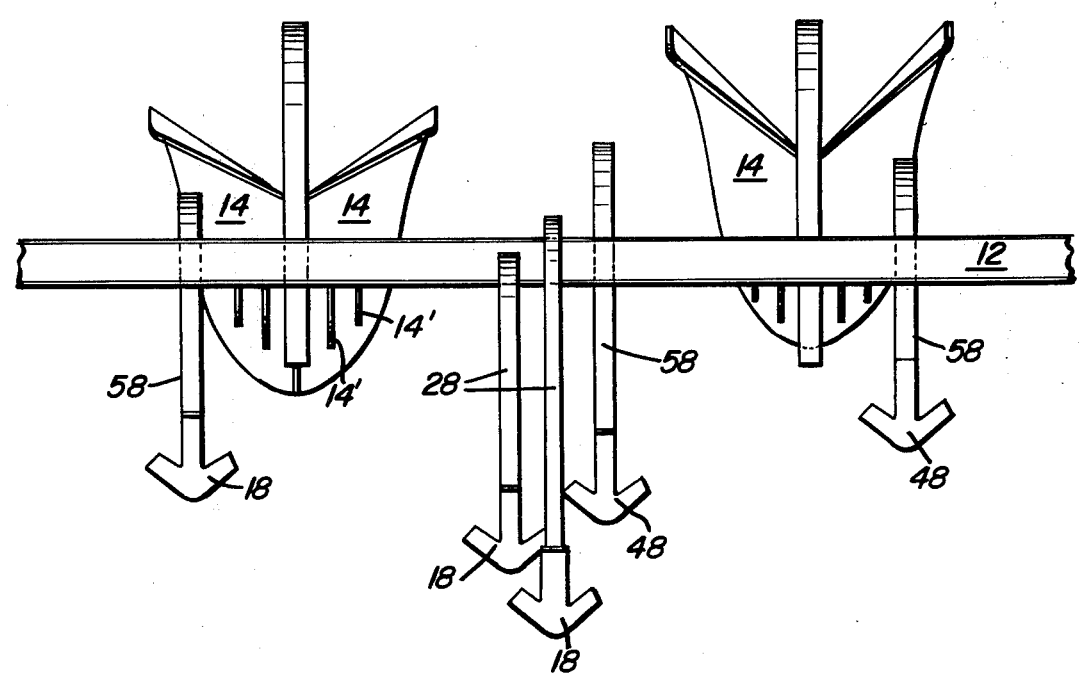
FIG. 5 is a top perspective view of a further modification of the invention.

Other embodiments of this invention are also shown, as in FIGS. 4 and 5, wherein additional elements are added or elements are removed or modified. Looking at FIG. 4, additional single moldboard plows (turning plows) 46 are provided. Each of these additional turning plows are similar to the original turning plow 16, i.e. that is they have the vertical upright cutting blades or swords 46' on the lower front edge thereof. The operation of these additional turning plows is similar to that already described above, but of course the number of thin layers interweaved together will be increased. Also the distance between the new rows 50 and 52, as shown in FIG. 7, would be wider than with the device of FIG. 1.

The embodiment of FIG. 5 eliminates the single moldboard plows or turning plows 16, 16', but adds additional single sweeps 48 on corresponding shanks 58. This embodiment would be used where the soil is already substantially pulverized and broken such as sandy-type soils and where the main double opposing moldboard plows 14, with swords 14' alone will do an adequate job.

From the above explanation of the operation of the device of this invention it can be seen how this new and improved implement completely pulverizes the soil and interlayers the organic material with said pulverized soil in a manner unique to the art.

Also the implement as disclosed by this invention, while basically quite simple, can produce new and unique results as compared to previously known implements of the type.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combination implement for plowing and breaking up soil in a single pass comprising a frame structure for attachment to a tractor, means attached to said frame structure for performing a plurality of cutting and turning operations in a single pass of the tractor mounted implement which includes the following elements, a deep cutting subsoiler, a first single sweep behind the deep cutting subsoiler and slightly offset outwardly to one side thereof, a second single sweep behind the deep cutting subsoiler and slightly offset outwardly therefrom to the side opposite the side of the first sweep and also slightly behind the first sweep, one single moldboard plow behind both single sweeps and slightly offset to one side outwardly of the first single sweep, another single moldboard plow behind both single sweeps and offset to one side outwardly of the second single sweep as well as being slightly behind the one single moldboard plow, one double moldboard plow behind both single moldboard plows and slightly offset outwardly from the one single moldboard plow, and another double moldboard plow behind both single moldboard plows and slightly offset outwardly from the other single moldboard plow so that a total of 10 turning and laying operations may be effected.

2. The structure as set forth in claim 1, wherein each of the single and double moldboard plows have vertical, horizontally spaced, cutting blades mounted thereon for cutting horizontal strips in the soil prior to the turning thereof by the respective plows.

* * * * *